(12) United States Patent
Herberthson

(10) Patent No.: US 7,518,543 B2
(45) Date of Patent: Apr. 14, 2009

(54) METHOD FOR DETERMINING POSITIONS OF TARGETS BY BISTATIC MEASUREMENTS USING SIGNALS SCATTERED BY THE TARGETS

(75) Inventor: Lars Magnus Herberthson, Linköping (SE)

(73) Assignee: Totalforsvarets Forskningsinstitut, Stockholm (SE)

( * ) Notice: Subject to any disclaimer, the term of this patent is extended or adjusted under 35 U.S.C. 154(b) by 461 days.

(21) Appl. No.: 10/517,305

(22) PCT Filed: Jun. 13, 2003

(86) PCT No.: PCT/SE03/00988

§ 371 (c)(1),
(2), (4) Date: Dec. 9, 2004

(87) PCT Pub. No.: WO03/107033

PCT Pub. Date: Dec. 24, 2003

(65) Prior Publication Data

US 2005/0219115 A1    Oct. 6, 2005

(30) Foreign Application Priority Data

Jun. 14, 2002   (SE)  .................................... 0201818

(51) Int. Cl.
*G01S 5/02* (2006.01)
*G01S 5/18* (2006.01)
*G01S 13/06* (2006.01)
*G01S 15/06* (2006.01)
*G01S 13/00* (2006.01)
*G01S 15/00* (2006.01)

(52) U.S. Cl. ............... 342/59; 342/25 R; 342/104; 342/118; 342/175; 342/195; 342/450; 342/451; 342/463; 342/464; 342/465; 367/87; 367/89; 367/90; 367/99; 367/117

(58) Field of Classification Search ...... 342/25 R–25 F, 342/27, 28, 59, 104–115, 118–146, 175, 342/192–197, 450–465, 26 D; 367/87, 89–94, 367/99–117

See application file for complete search history.

(56) References Cited

U.S. PATENT DOCUMENTS 3,161,870 A * 12/1964 Pincoffs ..................... 342/59

(Continued)

FOREIGN PATENT DOCUMENTS

SE    519 088 C2    1/2003

(Continued)

*Primary Examiner*—Bernarr E Gregory
(74) *Attorney, Agent, or Firm*—Jacobson Holman PLLC

(57) ABSTRACT

A method for determining the positions of targets by bistatic measurements using signals scattered by the targets is provided in which the velocities of the targets can also be determined. The range of the transmitters is selected so that a target at an arbitrary point can be measured, by scattering in the target, by at least four cooperating measuring facilities. First the targets are associated by calculating, in two independent ways, two sets of sums of distances between transmission points and targets and, respectively, targets and reception points. Subsequently, the two sums are sorted with respect to distance, compared with each other, and the sums that correspond with each other within a predetermined margin of error are stated to correspond to conceivable targets. The association of targets is improved and completed by corresponding calculations being carried out for Doppler velocities. Finally, the positions of the targets are calculated from a system of equations for the bistatically measured distances.

12 Claims, 1 Drawing Sheet

U.S. PATENT DOCUMENTS

| | | | |
|---|---|---|---|
| 3,179,355 A | * | 4/1965 | Pickering et al. ............... 342/59 |
| 3,184,739 A | * | 5/1965 | Franklin et al. ............. 342/451 |
| 3,378,835 A | * | 4/1968 | Mooney, Jr. et al. .......... 342/59 |
| 3,378,840 A | * | 4/1968 | Mooney, Jr. ................. 342/59 |
| 3,412,396 A | * | 11/1968 | Mooney, Jr. ................. 342/59 |
| 3,448,452 A | * | 6/1969 | Mooney, Jr. ................. 342/59 |
| 3,487,462 A | * | 12/1969 | Holberg ....................... 342/59 |
| 3,691,558 A | * | 9/1972 | Hoard et al. ................. 342/28 |
| 3,706,096 A | * | 12/1972 | Hammack ................... 342/107 |
| 3,789,397 A | * | 1/1974 | Evans .......................... 342/59 |
| 3,996,590 A | * | 12/1976 | Hammack ................... 342/465 |
| 4,347,513 A | * | 8/1982 | Schindler ..................... 342/59 |
| 4,499,468 A | * | 2/1985 | Montana et al. ............. 342/126 |
| 5,252,980 A | * | 10/1993 | Gray et al. .................... 342/59 |
| 5,302,955 A | * | 4/1994 | Schutte et al. ................ 342/59 |
| 5,365,236 A | * | 11/1994 | Fagarasan et al. ........... 342/195 |
| 5,381,156 A | * | 1/1995 | Bock et al. ................... 342/126 |
| 5,410,314 A | * | 4/1995 | Frush et al. ................ 342/26 D |
| 5,579,009 A | * | 11/1996 | Nilsson-Almqvist et al. .. 342/59 |
| 5,790,076 A | * | 8/1998 | Sypniewski ................. 342/465 |
| 6,043,770 A | * | 3/2000 | Garcia et al. .................. 342/59 |
| 6,064,331 A | * | 5/2000 | Avila et al. .................... 342/59 |
| 6,456,229 B2 | * | 9/2002 | Wurman et al. ............... 342/59 |
| 6,462,699 B2 | * | 10/2002 | Wurman et al. ............... 342/59 |
| 6,614,386 B1 | * | 9/2003 | Moore et al. .................. 342/59 |
| 6,850,186 B2 | | 2/2005 | Hellsten |

FOREIGN PATENT DOCUMENTS

| | | |
|---|---|---|
| SE | 519 089 C2 | 1/2003 |
| WO | WO 02/093191 A1 | 11/2002 |

* cited by examiner

METHOD FOR DETERMINING POSITIONS OF TARGETS BY BISTATIC MEASUREMENTS USING SIGNALS SCATTERED BY THE TARGETS

This is a nationalization of PCT/SE03/00988 filed Jun. 13, 2003 and published in English.

BACKGROUND OF THE INVENTION

1. Field of the Invention

The present invention relates to a method for determining positions of targets by bistatic measurements using signals scattered by the targets. Also the velocities of the targets can be determined. The method comprises a rapid bistatic association method which is suitable for, for instance, a network of radar stations in the manner of MSR (Associative Aperture Synthesis Radar) although there may be further fields of application. AASR is described, inter alia, in U.S. Pat. No. 6,850,186, which is herewith incorporated by reference. In the following, the description will be concentrated on the new method of associating by bistatic measurements only.

2. Description of the Related Art

First the fundamental problem that is solved by the invention will be presented. $N_s$ stations (for instance radar stations) are imagined to be set out in the space ($R^3$). The stations are designated $s_j$, $j=1, \ldots N_s$ and their position vectors are designated $\rho_j$, $j=1, \ldots N_s$. In addition to the stations, there are also $N_t$ moving targets which are to be detected. They are designated $t_i$, $i=1, \ldots N_t$ and have corresponding time-dependent position vectors $r_i=r_i(t)$, $i=1, \ldots N_t$.

Each station is capable of measuring distances (up to a certain maximum distance) and radial speed for each target. Thus, the station $s_j$, $1 \leq j \leq N_s$ will, at a certain point of time, measure $$d_j(k)=|r_k-\rho_j|, k=1, 2, \ldots N_{dj} \leq N_t$$

$$v_j(k)=(d/dt)|r_k-\rho_j|, k=1, 2, \ldots N_{dj} \leq N_t$$

For stations that are sufficiently close to each other, also bistatic measurement information is obtained, i.e. transmitting from one station and registration at another. For the pair of stations ($s_i$, $s_j$) it means that the following is registered $$d_{ij}(k)=|r_k-\rho_i|+|r_k-\rho_j|=d_i(k)+d_j(k), k=1, 2, \ldots N_{dij} \leq N_t$$

$$v_{ij}(k)=(d/dt)|r_k-\rho_i|+(d/dt)|r_k-\rho_j|=v_i(k)+v_j(k), k=1, 2, N_{dij} \leq N_t$$

It is to be noted that with these designations, $d_{ii}(k)=2d_i(k)$, $v_{ii}(k)=2v_i(k)$, $i=1,2,\ldots$, $k=1,2,\ldots$.

For each sensor (monostatic or bistatic geometry) targets are thus registered in respect of distance and Doppler. It is a priori not possible to know which registration from one sensor is associated with a certain registration from another sensor, i.e. originating from the same target. If registrations from different sensors are paired incorrectly, false targets, ghost targets, arise. The problem of association is to discriminate, among all conceivable possibilities of combining sensor data, corresponding to conceivable target candidates, between correct combinations (targets) and false combinations (ghosts).

The maybe most straight-forward method is to consider three neighbouring stations and their monostatic registrations, which for the sake of simplicity are assumed to be N in number. These measurements can be combined in $N^3$ ways where each combination corresponds to a target position which is determined up to reflection in the plane containing the three stations. (Certain combinations can be incompatible, corresponding to false candidates.) These ~$N^3$ candidates can then one by one be compared with the bistatic measurements and either be rejected or accepted. The problem of such a method is that it will be very slow if the number of targets, N, is large. For this reason, more efficient association algorithms have been developed.

Each target is to be determined in respect of position as well as velocity, i.e. they are to be positioned in a six-dimensional state space. The number of cells in the state space can be very large (~$10^{18}$), which means that traditional projection methods will be irretrievably slow.

The above Swedish Patent 0101661-7 discloses a method of attacking the problem of association by designing a sensor network so that each target is registered by many sensors (monostatic and bistatic), i.e. a high degree of redundancy is obtained in the system. Then the state space is divided into a manageable number of relatively large cells.

If the cells are just large enough, it will be possible to reject many of them, i.e. they cannot contain any targets, for the following reasons. If the cell contains a target, all (or almost all) of the possible sensors that can register targets in the current cell, will indicate such a registration. On the other hand, if the cell is empty, some sensors, and yet not too many, will still indicate registrations (from other targets) that are compatible with the cell in question. Owing to redundancy, a sufficient number of sensors will indicate the cell as empty, and it can be rejected. When the number of cells is thus reduced, the surviving cells are divided into smaller cells and the process is repeated. The process is repeated until the cells in the state space have reached the desired size. As the cells are becoming smaller, fewer and fewer ghost targets will survive, so that, when interrupting the process, practically only real targets are left. What speaks in favour of this method is that it uses (but also requires) the redundancy of the sensor network. However, it is not yet quite clear how rapid the method may eventually be.

An alternative method is disclosed in U.S. Pat. No. 6,954,404, which is herewith incorporated by reference, and implies that use is made of certain symmetries of the combination sensors—measurement data. Given two stations, the two monostatic measurements, together with the bistatic measurement, will share a symmetry, viz. that the three measuring geometries are all insensitive to rotation of the targets about the axis extending through the two stations. This means that it is possible to make an initial rapid screening of the candidates and delete a large number of false associations (ghosts). The subsequent final association will then be significantly more rapid. A drawback, however, is that the monostatic measurements will be important, which may be disadvantageous in connection with reconnaissance of stealth targets.

SUMMARY OF THE INVENTION

The present method according to the invention is based on using a rapid method where only bistatic measurements are utilised. Furthermore the method manages a certain dropout of sensors in a better way than the method that has been discussed directly above. The method solves the current problem of association by being designed in the manner as is evident from the independent claim. Advantageous embodiments of the invention are defined in the remaining claims.

DETAILED DESCRIPTION OF THE PREFERRED EMBODIMENTS

Figure 1:
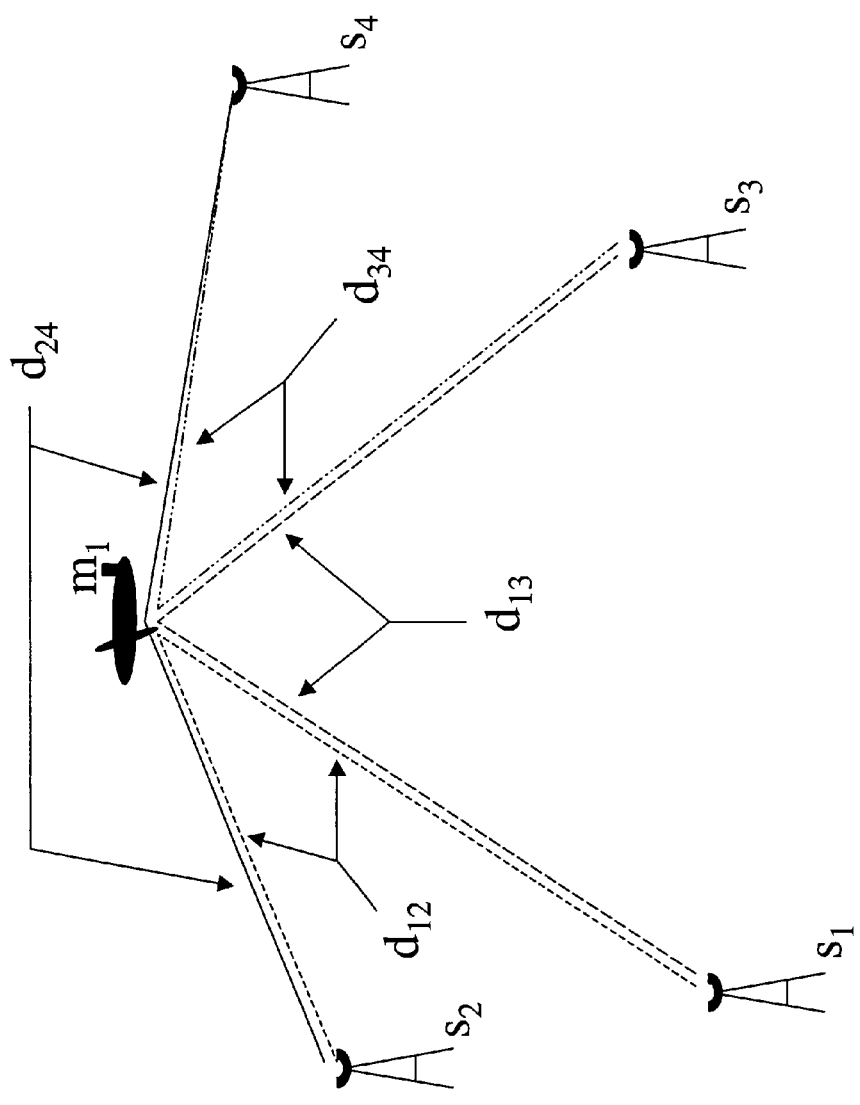
FIG. 1 illustrates an embodiment of a system and method for determining target position in a position space using a plurality of transmitters and receivers, in accordance with the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Before a more detailed description of the invention, first a multistatic network of ground radar stations will be contemplated, in which each radar station transmits radar pulses that are scattered towards flying targets and are then received by the surrounding stations. There will then be a situation involving a large number of bistatic measurements (i.e. the transmitting and the receiving station are located in different positions) and also monostatic measurements which, however, are not used in the invention. The bistatic measurements contain information about the total distance transmitter-target-receiver and corresponding Doppler information. A coherent air situation image is then to be created from all these measurements. This problem, the problem of association, is non-trivial if there are a large number of targets.

For intuitive understanding of the invention, a simple case is taken into consideration, involving only one target, $m_1$, and four stations $s_1, s_2, s_3, s_4$, as shown in FIG. 1. Now assume that the measurements $d_{12}, d_{34}, d_{13}, d_{24}$ are performed, where $d_{ij}$ means the total distance $s_i - m_l - s_j$. It will be appreciated that $d_{12} + d_{34} = d_{13} + d_{24}$ must be the case since both expressions mean the total distance from the target to the four stations.

If there are now N targets instead, the above observation can be used to correctly associate data in the following manner. All conceivable combinations of data of the type $d_{12}$ and $d_{34}$ are formed; they will be $N^2$ in number. In the same way, $N^2$ combinations of data of the type $d_{13}$ and $d_{24}$ are formed. These combinations are sorted and compared, and only sums from the two amounts that are equal (within a given tolerance) can correspond to real targets. The same discussion can be used about the Doppler velocities which thus give a further screening. In this way, quick and easy association of measurement data can be effected.

In general, the transmitters and receivers must be positioned and the range of the transmitters must be chosen so that a target at an arbitrary point within the position space can be measured via scattering in the target of at least four cooperating bistatic pairs of transmitters and receivers. The number of transmitters and receivers can be large. At least four such cooperating pairs are selected among these bistatic pairs to perform the association and the determination of the distance.

Below follows a more systematic presentation of the calculations. In order to obtain a simple description, the following (non-critical) assumptions are made. Assume that there are four stations and N targets, which all are seen by all sensors (monostatic as well as bistatic).

Input data is thus (monostatic measurements)

$$d_j(k) = |r_k - \rho_j|, k=1, 2, \ldots N, j=1,2,3,4$$

$$v_j(k) = (d/dt)|r_k - \rho_j|, k=1, 2, \ldots N, j=1,2,3,4$$

and (bistatic measurements)

$$d_{ij}(k) = |r_k - \rho_i| + |r_k - \rho_j| = d_i(k) + d_j(k), k=1, 2, \ldots N, j=1,2,3,4$$

$$v_{ij}(k) = (d/dt)|r_k - \rho_i| + (d/dt)|r_k - \rho_j| = v_i(k) + v_j(k), k=1, 2, \ldots N, j=1,2,3,4$$

where i=j in the bistatic case corresponds to monostatic measurements, i.e. i≠j can be assumed if desirable.

It is to be noted that, for instance, for station j, with the monostatic measurement $d_j(k)$, k=1,2, ... N, it is not possible to know which measurement belongs to a certain target, i.e. the measurements are to be regarded as a set which is as a suggestion sorted according to distance. In this way, there is no connection between a certain index k which belongs to two different sensor registrations.

The method is now based on the following observation: For each registered target (not candidate, but real target) there must be a k, a k', an l and an l', all between 1 and N so that $$d_{12}(k) + d_{34}(l) = d_{13}(k') + d_{24}(l')$$

For the same k, k', l, l', the following is also applicable $$v_{12}(k) + v_{34}(l) = v_{13}(k') + v_{24}(l')$$

The reason is that if the target has the space vector $r_t$, it is applicable for the target that $$d_{12}(k) + d_{34}(l) = |r_t - \rho_1| + |r_t - \rho_2| + |r_t - \rho_3| + |r_t - \rho_4|$$

and in the same way that $$d_{13}(k) + d_{24}(l) = |r_t - \rho_1| + |r_t - \rho_3| + |r_t - \rho_2| + |r_t - \rho_4|$$

so that they are equal. The argument for the velocities is identical. The suggested method now is as follows.

Step 1. Form the $N^2$ sums $$d_{12}(k) + d_{34}(l), 1 \leq l, k \leq N$$

Sort them according to the total distance and designate them $$d_{12+34}(m), 1 \leq m \leq N^2$$

Step 2. Proceed in the same way with $$d_{13}(k') + d_{24}(l'), 1 \leq l', k' \leq N$$

so that the following will also be obtained (sorted)

$$d_{13+24}(m'), 1 \leq m' \leq N^2$$

Step 3. Associate targets from $\{d_{12+34}(m)\}_{m=1,2 \ldots N^2}$ with targets from $\{d_{13+24}(m')\}_{m'=1,2 \ldots N^2}$ if $$|d_{12+34}(m) - d_{13+24}(m')| < \text{suitable tolerance}$$

Step 4. Investigate, and keep associated targets if they also satisfy $$|v_{12+34}(m) - v_{13+24}(m')| < \text{suitable tolerance}$$

"Suitable tolerance" in Step 3 is determined, inter alia, by the transmitted signal bandwidth, the purpose of the processing and hypotheses about size and number of the targets. Usually it is from about one meter to some twenty or thirty meters. Correspondingly, "suitable tolerance" in Step 4 is usually a few meters/second.

To establish that this really results in a rapid method, the following rough estimate may be used. Assume that there are many targets so that they are of the same magnitude as the number of distance bins and the number of Doppler bins. This common number is again designated N. It may then be estimated that, since the total number of cells (=number of distance bins by the number of Doppler bins) is the same as the number of candidates in for instance $\{d_{12+34}(m)\}_{m=1,2 \ldots N^2}$, each such candidate will be paired with typically a false candidate from $\{d_{13+24}(m')\}_{m'=1,2 \ldots N^2}$. The number of candidates according to the above procedure thus is ~$N^2$ (fewer with fewer targets), which is a great reduction compared with $N^3$. Further processing can then take place by comparing with the remaining bistatic geometry $\{d_{14+23}(m'')\}_{m''=1,2...N^2}$, the mono static measurements or measurements involving other stations.

It is also to be noted that it is possible to involve $\{d_{14+23}(m'')\}_{m''=1,2...N^2}$ from the beginning. This gives a possibility of having a redundancy, i.e. a possibility of managing a certain dropout in registrations, in the following way. The condition that $|d_{12+34}(m)-d_{13+24}(m')|<$"suitable tolerance" can be seen as if both $d_{12+34}(m)$ and $d_{13+24}(m')$ are to be close to a certain given value. By requiring instead that two of $d_{12+34}(m)$, $d_{13+24}(m')$ and $d_{14+23}(m'')$ should be close to the indicated value (for some values of m, m' and m'') there will still be a discrimination between false candidates (ghosts) and targets. However, it may be accepted that one of the measurements drops out.

The calculations in their entirety require $O(N^2 \log N)$ operations, and there are simple methods of really obtaining position and velocity from the candidates, i.e. after processing four bistatic distances are known for a certain candidate as follows:

$$|r-\rho_1|+|r-\rho_2|=d_{12}$$

$$|r-\rho_3|+|r-\rho_4|=d_{34}$$

$$|r-\rho_1|+|r-\rho_3|=d_{13}$$

$$|r-\rho_2|+|r-\rho_4|=d_{24}$$

It is, of course, interesting to know the value of r (position of the target), i.e. a method of solving the above system of equations. ($\rho_i$, i=1,2,3,4, are the known positions/position vectors of the stations and $d_{12}$, $d_{34}$, $d_{13}$, $d_{24}$ are the measured bistatic distances.) Generally seen, intersections of ellipsoids cause relatively complicated algebraic systems of equations, but in this case the system of equations can be solved by simpler methods.

If the system of equations is regarded as a 4×4 system, it is obvious that it is degenerated. At the same time the condition $d_{12}+d_{34}=d_{13}+d_{24}$ guarantees that there is a parameter solution. By selecting the origin of coordinates in $\rho_4$ so that $|r-\rho_4|=|r|=r$ and introducing r as a parameter, the following equations are obtained $$|r-\rho_1|=d_{12}-d_{24}+r$$

$$|r-\rho_2|=d_{24}-r$$

$$|r-\rho_3|=d_{34}-r$$

It is here possible to square the three equations, in which case $r^2$ can be deleted, and obtain the following (for some $a,b,c,\alpha,\beta,\gamma$)

$$r \cdot \rho_1 = ar+\alpha$$

$$r \cdot \rho_2 = br+\beta$$

$$r \cdot \rho_1 = cr+\gamma$$

The latter system of equations can then be solved in a fairly straight-forward way. However, there will be two different cases in dependence on whether $\{\rho_i\}_{i=1,2,3}$ is linearly dependent or not.

The case of the velocities is similar, the following system of equations will be obtained $$\hat{u}_1 \cdot \bar{v} + \hat{u}_2 \cdot \bar{v} = v_{12}$$

$$\hat{u}_3 \cdot \bar{v} + \hat{u}_4 \cdot \bar{v} = v_{34}$$

$$\hat{u}_1 \cdot \bar{v} + \hat{u}_3 \cdot \bar{v} = v_{13}$$

$$\hat{u}_2 \cdot \bar{v} + \hat{u}_4 \cdot \bar{v} = v_{24}$$

where $$\hat{u}_i = \frac{\bar{r}-\bar{r}_i}{|\bar{r}-\bar{r}_i|}, \quad \bar{V} = \dot{\bar{r}}, \quad i = 1, 2, 3, 4.$$

The system of equations can be processed in the same fundamental way as the previous system of equations.

The invention can be implemented in high-level languages which are suitable for calculations, such as MatLab, C, Pascal, Fortran etc.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. A method for determining positions of targets in a position space using signals scattered by the targets, comprising:
   using a plurality of transmitters and a plurality of receivers of electromagnetic or acoustic signals, spread as a plurality of bistatic pairs in known points in the position space, each bistatic pair of a transmitter and a receiver being referred to as a measuring facility, the transmitter and the receiver of each bistatic pair being respectively placed at two different ones of said known points, the positions of the transmitters and receivers and the range of the transmitters being selected so that a target at an arbitrary point within the position space is measured by scattering in the target by at least four cooperating measuring facilities;
   analyzing received signals, which includes determining moments of transmission and reception and parameterization of received signals as a function of the path of propagation between transmission point and reception point;
   selecting an even number of at least four cooperating measuring facilities for the target position determination;
   associating targets by calculating, in two independent ways, two sets of sums of distances between transmission points and targets and, respectively, targets and reception points, based on bistatic distances, measured via the targets, for selected measuring facilities; sorting said two sums with respect to the distance; and comparing and establishing that the sums, calculated in the two different ways, which correspond with each other within a predetermined margin of error, are stated to correspond to conceivable targets;
   completing and improving said target association by performing calculations for bistatically measured Doppler velocities, corresponding to calculations for distances, and establishing that the sums, calculated in the two different ways, which correspond with each other within a predetermined margin of error, are stated to correspond to targets; and
   calculating the positions of the targets from a system of equations for the bistatically measured distances.

2. The method as claimed in claim 1, wherein the step of completing and improving target association further comprises:

calculating the sum of all distances between the targets and the transmission points and the reception points, respectively, in a third way as the sum of bistatically measured distances via the target for measuring facilities;

sorting the sum calculated in the third way with respect to the distance and comparing this with previously calculated sums of distances; and establishing that those cases where two of the three sums, calculated in said different ways, correspond with each other within a predetermined margin of error, are stated to correspond to targets.

3. The method as claimed in claim 2, wherein the step of completing and improving target association further includes requiring that all three sums, calculated in said different ways, correspond with each other within a predetermined margin of error in order for targets to be indicated.

4. The method as claimed in claim 1, wherein the step of completing and improving target association further comprises:

calculating the sum of all Doppler velocities between the targets and the transmission points and the reception points, respectively, in a third way as the sum of bistatically measured Doppler velocities via the target for measuring facilities;

sorting the sum calculated in the third way with respect to Doppler velocity and comparing this sum with previously calculated sums of Doppler velocities; and establishing that the cases where two of the three sums, calculated in said different ways, correspond with each other within a predetermined margin of error, are stated to correspond to targets.

5. The method as claimed in claim 4, wherein the step of completing and improving target association further includes requiring that all three sums, calculated in said different ways, correspond with each other within a predetermined margin of error in order for targets to be indicated.

6. The method as claimed in claim 5, wherein the velocities of the targets are calculated from a system of equations for the bistatically measured Doppler velocities.

7. A system for determining positions of targets in a position space using signals scattered by the targets, comprising:

a plurality of transmitters and a plurality of receivers of electromagnetic or acoustic signals, spread as a plurality of bistatic pairs in known points in the position space, each bistatic pair of a transmitter and a receiver being referred to as a measuring facility, the transmitter and the receiver of each bistatic pair being respectively placed at two different ones of said known points, the positions of the transmitters and receivers and the range of the transmitters being selected so that a target at an arbitrary point within the position space is measured by scattering in the target by at least four cooperating measuring facilities;

analysis equipment for storing and analyzing received signals and configured to determine moments of transmission and reception and to parameterize received signals as a function of the path of propagation between transmission point and reception point;

said analysis equipment being configured to select an even number of at least four cooperating measuring facilities for the target position determination and to associate targets by calculating, in two independent ways, two sets of sums of distances between transmission points and targets and, respectively, targets and reception points, based on bistatic distances, measured via the targets, for selected measuring facilities; to sort said two sums with respect to the distance; and to compare and establish that the sums, calculated in the two different ways, which correspond with each other within a predetermined margin of error, are stated to correspond to conceivable targets;

said analysis equipment being further configured to perform calculations for bistatically measured Doppler velocities, corresponding to calculations for distances, and to establish that the sums, calculated in the two different ways, which correspond with each other within a predetermined margin of error, are stated to correspond to targets; and said analysis equipment being further configured to calculate the positions of the targets from a system of equations for the bistatically measured distances.

8. The system as claimed in claim 7, wherein said analysis equipment is further configured to calculate the sum of all distances between the targets and the transmission points and the reception points, respectively, in a third way as the sum of bistatically measured distances via the target for measuring facilities, to sort the sum calculated in the third way with respect to the distance and compare this sum with previously calculated sums of distances, and to establish that those cases where two of the three sums, calculated in said different ways, correspond with each other within a predetermined margin of error, are stated to correspond to targets.

9. The system as claimed in claim 8, wherein said analysis equipment is further configured to require that all three sums, calculated in said different ways, correspond with each other within a predetermined margin of error in order for targets to be indicated.

10. The system as claimed in claim 7, wherein said analysis equipment is further configured to calculate the sum of all Doppler velocities between the targets and the transmission points and the reception points, respectively, in a third way as the sum of bistatically measured Doppler velocities via the target for measuring facilities, to sort the sum calculated in the third way with respect to Doppler velocity and compare this sum with previously calculated sums of Doppler velocities, and to establish that the cases where two of the three sums, calculated in said different ways, correspond with each other within a predetermined margin of error, are stated to correspond to targets.

11. The system as claimed in claim 10, wherein said analysis equipment is further configured to require that all three sums, calculated in said different ways, correspond with each other within a predetermined margin of error in order for targets to be indicated.

12. The system as claimed in claim 11, wherein said analysis equipment is configured to calculate the velocities of the targets from a system of equations for the bistatically measured Doppler velocities.

* * * * *